Figure 1:
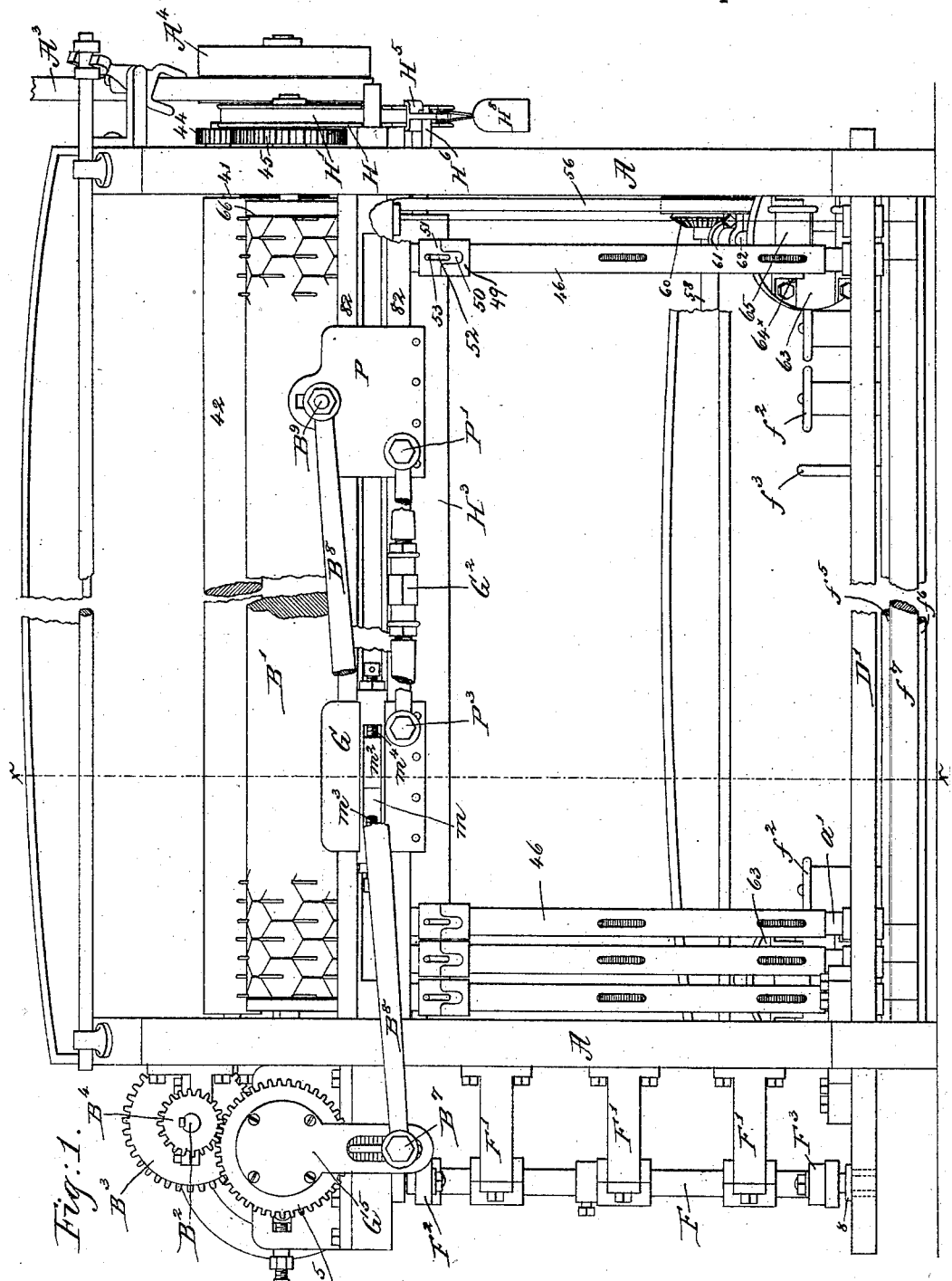

(No Model.) 3 Sheets—Sheet 1.

B. SCARLES.
WIRE NETTING MACHINE.

No. 380,665. Patented Apr. 3, 1888.

Witnesses.
Arthur Zipperlen
John F. C. Brainerd

Inventor:
Benjamin Scarles.
by Crosby & Gregory attys.

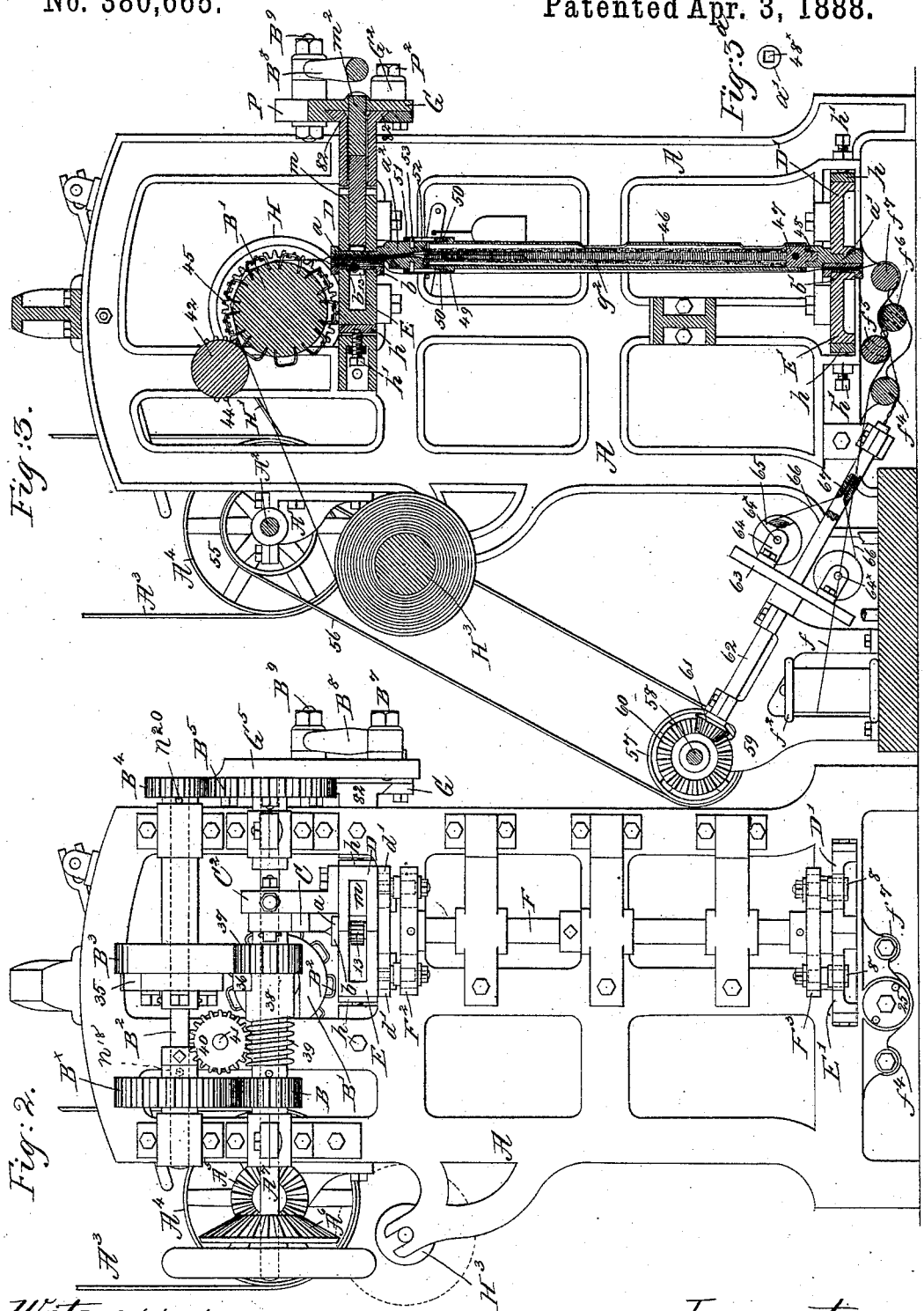

(No Model.) 3 Sheets—Sheet 3.
B. SCARLES.
WIRE NETTING MACHINE.
No. 380,665. Patented Apr. 3, 1888.
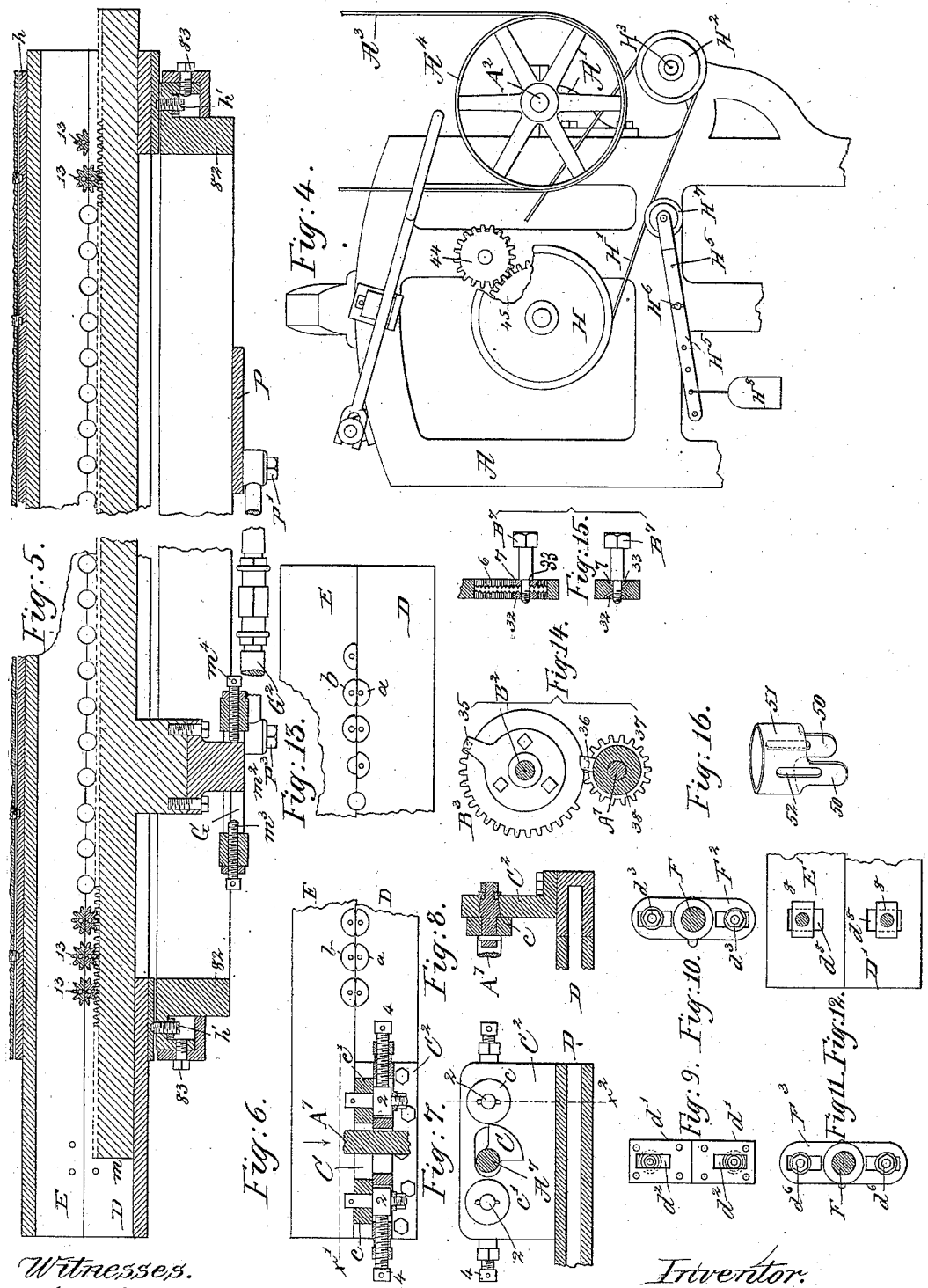
Witnesses.
Arthur Zipperlen.
John F. C. Prenishett.
Inventor.
Benjamin Scarles
by Crosby & Gregory attys.

UNITED STATES PATENT OFFICE.

BENJAMIN SCARLES, OF CLINTON, MASSACHUSETTS, ASSIGNOR TO THE CLINTON WIRE CLOTH COMPANY, OF SAME PLACE.

WIRE-NETTING MACHINE.

SPECIFICATION forming part of Letters Patent No. 380,665, dated April 3, 1888.

Application filed December 3, 1886. Serial No. 220,585. (No model.)

*To all whom it may concern:*

Be it known that I, BENJAMIN SCARLES, of Clinton, county of Worcester, and State of Massachusetts, have invented an Improvement in Wire-Netting Machines, of which the following description, in connection with the accompanying drawings, is a specification, like letters on the drawings representing like parts.

This invention is an improvement upon the wire-netting machine represented in my application, Serial No. 220,584, filed on the 3d day of December, 1886, whereby the said machine is better adapted for the production of heavier grades of wire-netting. I have also added means whereby some of the wires may be twisted to form selvages, the selvage-twisting devices being more or less in number, according to the number of strips of netting to be made side by side upon the same machine. The spindles for twisting together the selvage-wires for each strip of netting being produced are caused to rotate in opposite directions, to thereby enable the twist in the united selvage-wires to run in such direction that the wires composing the body of the net, when being twisted with the said selvage, will twist into the channels between the independent wires constituting the selvage wires. The worm for effecting the rotation of the mesh-roll, instead of being driven continuously, as in the said application, is driven intermittingly, and made to actuate an independent shaft extended across the machine parallel to the mesh-roll, the said shaft having upon it a pinion which engages a gear fast on and so rotating the mesh-roll. The rack-bar herein shown, it being substantially the same as in my said application, is driven in substantially the same way by a slide; but the said slide, instead of being attached by a pitman directly to a crank, is connected by an adjustable link to an auxiliary slide, the latter being joined by a long pitman directly to the crank, such arrangement of devices for operating the slide and rack-bar greatly lessening frictional and other strains and better adapting the machine for the manufacture of coarser grades of netting composed of heavier wire. Herein the cop-holding tubes are so joined with the twisting-segments and feet holding the said tubes that the tubes may be readily removed from the machine to be filled, or for other purposes.

The particular features in which my invention consists will be hereinafter described, and fully designated in the claims at the end of the description of the machine.

Figure 1, in front elevation partially broken out, shows a sufficient portion of a machine embodying my invention to enable the same to be understood, but few of the cop-holding tubes being shown, as all are alike. Fig. 2 is a left-hand end elevation of Fig. 1. Fig. 3 is a vertical section of Fig. 1 in the line $x\,x$. Fig. $3^a$ is a plan view of the upper end of the foot entered by the block attached to the lower end of the cop-holding tube. Fig. 4 is a partial right-hand elevation of Fig. 1. Fig. 5 is a longitudinal section taken through the upper carriages, the rack-bar, and some of the twisting-segments, said figure also showing the guides for the main and auxiliary slides and some of the connecting devices for the said slides. Fig. 6 is a sectional detail showing part of the shaft and cam thereon for positively moving the main carriage. Fig. 7 is a section of Fig. 6 in the dotted line $x'$, looking in the direction of the arrow. Fig. 8 is a section of Fig. 7 in the dotted line $x^2$. Figs. 9 to 11 are details, to be referred to, instrumental in causing the movement of the carriages. Fig. 12 is a detail showing the ends of the lower carriages and the blocks entering them. Fig. 13 shows portions of the upper carriages in a position different from that shown in Fig. 6. Fig. 14 is a detail showing the mutilated gear instrumental in producing or giving intermitting movement to the mesh-roll. Fig. 15 is a detail representing in longitudinal and cross section the crank and clamping-blocks therein to hold the stud of the crank in position, and Fig. 16 is a detail of the clutch for uniting the upper end of the cop-holding tube to the compensating tension device or block forming part of or connected to one of the twisting-segments.

The frame-work A, of suitable shape to support the working parts, has bearings A', to receive a power-shaft, $A^2$, driven by a belt, $A^3$, on a pulley, $A^4$. The shaft $A^2$ has a beveled pinion, $A^5$, which engages a beveled gear, $A^6$, fast on and so as to rotate a cam-shaft, $A^7$, provided with a cam, C, (see Figs. 6 and 7,) the said cam in its rotation co-operating with rolls $c\ c'$, attached to a bracket, $C^2$, secured to the main carriage D, the said cam, rolls, bracket, and carriage, as well as the carriages D E D' E', the vertical rocking shaft F, its bearings, the cross-arms $F^2\ F^3$, the adjustable studs carried by them and entering slots in the plates $d'$, attached to the carriages D E and the blocks 8, entering slots near the ends of the carriages D' E', the tension and straightening rolls $f^4\ f^5\ f^6\ f^7$, which operate upon all the bobbin-wires $f$ coming from the bobbins $f^2$, the adjustable annular plates 25, by which to alter the position of the rolls $f^5\ f^6$ with relation to the rolls $f^4$ and $f^7$ to vary the tension on all the wires passed between them, the rack $m$, provided with the projection $m^2$, the slide G, the twisting-segment $a$, having the block $a^2$ shaped to constitute a compensating tension device, the twisting-segments $b\ b'$, the gibs $h$, screws $h'$, to adjust them, the gear $B^5$, the mesh-roll B', the adjusting-screws 4, to aid in adjusting the studs 2, carrying the rolls $c\ c'$, the take-up roll $H^3$, belt H', weighted lever $H^5$, sheave $H^7$, and adjustable screws $m^3\ m^4$, held in the ears of the slide G, are all common to my said application, to which reference may be had, in which like letters are employed to designate like parts.

The pinion B, fixed to the shaft $A^7$, engages a gear, $B^\times$, which, when the shaft $B^2$ is to be driven at a slow speed, is loose thereon. As herein shown, it is supposed that the shaft $B^2$ is to be driven at slow speed, and consequently the pin, which would otherwise enter the hole $n^{18}$ in the hub of the gear $B^\times$, (see dotted lines, Fig. 2,) is removed, the said pin when in said hole also entering a corresponding hole in the shaft $B^2$. The pin referred to is designated by the letter $n^{20}$, and, as shown in Fig. 2, it is passed into a hole in the hub of the spur-gear $B^4$, thus pinning it to the shaft $B^2$, the said spur-gear $B^4$ being of smaller diameter than the gear $B^\times$. The shaft $A^7$ has fast on it a gear, $B^5$, which engages the pinion $B^4$, fast, as herein shown, on the shaft $B^2$, and thus the shaft $A^7$ rotates the shaft $B^2$ at a slow speed.

If it should be desired to rotate the shaft $B^2$ at slower speed with relation to the speed of the shaft $A^7$, then the pin $n^{20}$ will be removed from the hub of the pinion $B^4$ and be put in the hole $n^{20}$, such change of position of the pin leaving the spur-gear $B^4$ loose and gear $B^\times$ fast on shaft $B^2$.

The gear $B^5$ has attached to it a crank, $G^5$, which crank by a stud, $B^7$, pitman $B^8$, and stud $B^9$ is connected to an auxiliary slide, P, fitted to slide upon suitable guideways or ledges, 82 82, secured to the frame-work by screws 83 84. (See Fig. 5.) The auxiliary slide P has a stud, P', which receives upon one end of it an adjustable link, $G^2$, constructed substantially as the link designated by like letter in my said application, only shorter. The opposite end of the link $G^2$ is joined by a stud, $P^3$, to the slide G, provided with screws $m^3\ m^4$, which at times meet the projection $m^2$, attached to the rack $m$, and move the said rack so that its teeth in engagement with the semi-gear 13 of the twisting-segments $a\ b$ rotate the same to twist together the wires carried by them, the said slide G and its screws operating the said rack-bar and twisting-segments, all as in the application referred to. The slide G is moved on the guides 82 82, referred to. By the employment of a long pitman, as $B^8$, and an auxiliary slide, as P, and connecting the said auxiliary slide to the slide G by a link, as $G^2$, I am enabled to secure a more steady and stronger movement of the devices actuating the rack-bar, thus enabling me to more thoroughly and accurately twist together larger wires, such as employed for coarser grades of wire-netting. The rotation of the central nut of the link $G^2$, it co-operating with the right and left hand screw-threads forming part of the said link, enables the stroke of the slide G to be regulated in such manner as to leave the rack and semi-gears actuated by it in exactly their proper positions, so as not to interfere with the sliding movement of the carriages when moved in unison with the main carriage D through the shaft F.

The crank $G^5$ is connected to the gear $B^5$ substantially as in the said application; but the arm of the crank herein shown is slotted, as shown best in Fig. 1, and in the detail, Fig. 15.

The crank-arm is so slotted (see Fig. 15) where the arm is shown in section as to leave wedging faces which are scored or serrated, as at 6, the serrations at one side of the arm receiving a serrated conical-faced washer, 7, while the slot at the opposite side of the arm receives a serrated or conical-faced nut, 32, into which is screwed the threaded end of the stud $B^7$, the said stud having a shoulder, 33, which bears against the outer or flat face of the said washer.

To change the point of connection of the pitman $B^8$ with the crank $G^5$, and thus insure just the proper extent of movement of the rack-bar $m$ and twisting-segments, it is only necessary to unscrew the stud $B^7$ from the nut 32 far enough to permit it and the washer 33 to have their serrated faces removed from the serrations 6 of the arm $G^5$, so that the stud $B^7$ may be adjusted in the slot of the said arm sufficiently, and thereafter when in adjusted position the stud $B^7$ will be again turned in the direction to screw it into the said nut 32, thereby securely fastening the stud accurately in position on the arm, the serrations and nut and washer described affording means whereby very fine and accurate adjustments may be made.

The mutilated gear $B^3$, having teeth about substantially half of its periphery, is provided with a finger or projection, 35, which in operation meets a finger or projection, 36, attached to a sleeve, 38, to which is secured a pinion, 37.

During one-half of its rotation the teeth of the gear B³ engage the teeth of the pinion 37, fast upon the said sleeve 38, loose on the shaft A⁷, the mutilated gear B³ rotating the said pinion 37 and sleeve 38 once and then leaving it at rest, the period of rest being while the plain part of the gear B³ is next the pinion 37. The finger 35 of the gear B³, by striking the finger 36 of the pinion 37, insures the correct entrance of the leading tooth of the mutilated gear B³ into a space between adjacent teeth of the pinion 37.

The rotation of the gear 37 rotates the sleeve 38, having a worm, 39, which engages the teeth of a worm-gear, 40, fast on the journal 41 of a long roll or shaft, 42, which, extended across the machine from end to end, is provided at its farther end (see Fig. 1) with a pinion, 44, which engages a gear, 45, secured to the journal or shaft of and so as to rotate the mesh-roll B', it having suitable teeth or projections to enter the meshes of the netting, substantially as in the application referred to.

The mesh-roll carries a pulley, H, about which is passed a belt, H', which is carried over a pulley, H², fast on the shaft or journal of the take-up roll H³, the said belt rotating the take-up roll frictionally, the belt being acted upon by a sheave, H⁷, carried by a lever, H⁵, pivoted at H⁶, the lever having attached to it adjustably a weight, substantially as in the said application, excepting that by the devices described, including the mutilated gear and the pinion 37, the mesh-roll receives an intermitting movement rather than a continuous movement of rotation.

The cop-holding tube 46, which receives the cop g² of wire, has secured to its lower end a block, 47, having a stem, 48, (see Fig. 3,) which is square or other than round in cross-section, the said stem entering a correspondingly-shaped hole, 48ˣ, in the foot a', (see Fig. 3ª,) the connection being such that the rotation of the tube 46, while the stem 48 is in the socket of the foot, causes the foot to be rotated in unison with it, the said foot a' having its flat face in contact with the twisting-segment b', thus effecting its rotation, as in the said application. The upper end of the cop-holding tube 46 has a collar, 49, (shown in section, Fig. 3,) and above the collar the tube is grooved to receive one or more tongues or prongs, 50, (see Figs. 3 and 16,) extended downwardly from a short tube, 51, slotted at 52 (see Fig. 16) for the reception of a pin or pins, 53, (see Fig. 3,) carried by the block a², attached to the twisting-segment a, the said block and the bulged surface constituting a compensating tension device, as well as the said segment being in construction and operation as in the said application.

The sleeve 51 may be raised and lowered to remove the prongs 50 from engagement with the grooves in the upper end of the cop-holding tube when it is desired to remove the tube to supply the same with a cop of wire; but when the prongs enter the said slots, as in Figs. 1 and 3, the rotation of the segment a and block a² carries with them the sleeve 51 and the said tube.

The power-shaft A² has upon it a belt-pulley, 55, which receives a belt, 56, which is extended over a belt-pulley, 57, on a shaft, 58, arranged in suitable bearings on a bracket or stand, 59, the said shaft being provided with suitable bevel gears, 60, near its ends or near the ends of the machine, or wherever it may be desired to introduce twisting selvage-wires in the netting being made. Each gear 60 engages a beveled pinion, 61, fast on a shaft, 62, supported in suitable bearings, as of the stand, the said shaft having a disk, 63, provided with suitable ears, 64, which receive the journals or shafts 64ˣ, which support two or more spools, 65, carrying the wires 66, which are to be twisted together, as shown in Fig. 3, preparatory to entering one of the twisting-segments b', from which segment the wire will be led through a twisting-segment, b, in the carriage E, the said selvage-wires so twisted together and issuing from the twisting-segment b, through which they are drawn, being twisted with other wires coming from the cop-holding tubes just as are the bobbin-wires f; but whenever a twisted wire is used as described one of the bobbin-wires will be left out, thus enabling the twisted wires to alone constitute a selvage.

The wires 66, led into a longitudinal groove, 67, of the shaft 62, and issuing from the ends of the said shaft twisted together, as shown in Fig. 3, are passed under the roller f⁴ and between the rollers f⁵ f⁶ and under the roller f⁷, and the said selvage-wires are subjected to tension and are straightened simultaneously with the bobbin-wires f, coming from the spools or bobbins f².

If it is desired to produce more than two strips of netting on the same machine, intermediate spindles, 62, will be placed in the machine at suitable places where it is desired to deliver selvage-wires.

The spindle employed to effect the twisting of two wires, 66, for one selvage will be rotated in one direction, as to the right; but the spindle for effecting the twisting of the wires for the opposite selvage will be twisted in the opposite direction or to the left, to thus enable the cop-wires to be twisted into the selvage-wires in the direction of the channel formed therein between the wires 66. This may be done by driving one spindle from one side of one of the beveled gears 60 and the other spindle from the opposite side of a like beveled gear attached to the same shaft.

I do not herein claim anything shown in my said application, Serial No. 220,584.

In handling cops g² of wire for coarser grades of netting it is desirable and very convenient in introducing the wire to remove the tube 46, and this, as herein provided for, may be done very quickly, and yet the construction is such that the cop-holding tube when in place is made the driver for the foot a' and the segment $b'$. The two shafts $A^7$ and $B^2$, the gearing carried by them, including the mutilated gear and the sleeve provided with a worm engaging the worm-wheel, are made the subject-matter of a claim in application, Serial No. 220,587, filed December 3, 1886, for improvement in mechanical movement, so that the said parts are not herein broadly claimed.

I claim—

1. In a machine for the manufacture of wire-netting, the carriages D E, twisting-segments mounted therein, a rack-bar to rotate the said segments, and a slide to effect the movement of the rack-bar, combined with an auxiliary slide, a link to connect the said slides, and means to move the auxiliary slide, substantially as described.

2. The gear $B^5$, the shaft $A^7$, to rotate it, and the slotted arm $G^5$, connected to the said gear or moving with the said shaft and provided with serrations, and the slide and pitman and the rack and twisters, combined with the stud, washer, and nut, the serrations of the arm, nut, and washer being engaged together to firmly hold the stud and pitman in adjusted position, substantially as described.

3. The shaft $B^2$, its attached mutilated gear and finger, and the sleeve 38, its attached pinion 37, and finger 36, and worm, combined with the mesh-roll, and mechanism, substantially as described, intermediate the said worm and the mesh-roll, whereby the mesh-roll is rotated intermittingly by the said worm, substantially as described.

4. The carriage D′, the cop-holding tube having at one end a block, 47, and the foot $a'$ in the said carriage, the block and foot being connected together by a projection on one entering a hole in the other to effect their rotation in unison, yet form a loose connection, combined with the carriage D and twisting-segment $a$ therein, and means to connect the upper end of the cop-holding tube with the said twisting-segments, substantially as described, whereby the cop-holding tube may be rotated positively by the segment $a$ and yet be readily removed from the machine when it is desired to fill the tubes, as set forth.

5. In a machine for the manufacture of wire-netting, the carriages, their twisting-segments, and cop-holding tubes and twisting mechanism, substantially as described, to twist together two or more wires to form a selvage, combined with the tension mechanism controlling not only all the bobbin-wires, but also the selvage-wires, the twisted selvage-wires issuing from one of the twisting-segments $b$, substantially as described.

6. In a machine for the manufacture of wire-netting, the carriages, their twisting-segments, and cop-holding tubes and tension mechanism for all the bobbin-wires, combined with twisting mechanism, substantially as described, to twist together two or more wires to form a selvage, the said twisted wires issuing from one of the twisting-segments $b$, combined with two shafts, 62, their spools or bobbins 64, and bevel-gears secured to the said shafts 62, and with means, substantially as described, to rotate the said shafts 62 in opposite directions, whereby the wires twisted together to form opposite selvages are twisted in opposite direction to permit the cop-wires twisted with them to fall into the spiral grooves between the wires twisted together to form the selvage, as set forth.

7. In a machine for the manufacture of wire-netting, the cop-holding tube provided at its upper end with grooves and supported at its lower end by a foot, combined with a segment, $a$, its block, and the sleeve 51, provided with a prong to enter the groove of the cop-holding tube, substantially as described.

8. The mesh-roll, the gear 45, attached to its shaft or journal at one end, the roll 42, and its attached gears 44 and 40, combined with the sleeve 38, having the worm 39, pinion 37, and means, substantially as described, to rotate the said sleeve, for the purposes set forth.

In testimony whereof I have signed my name to this specification in the presence of two subscribing witnesses.

BENJAMIN SCARLES.

Witnesses:
 BURT CHELLIS,
 JOHN W. FORRESTER.